Figure 1:
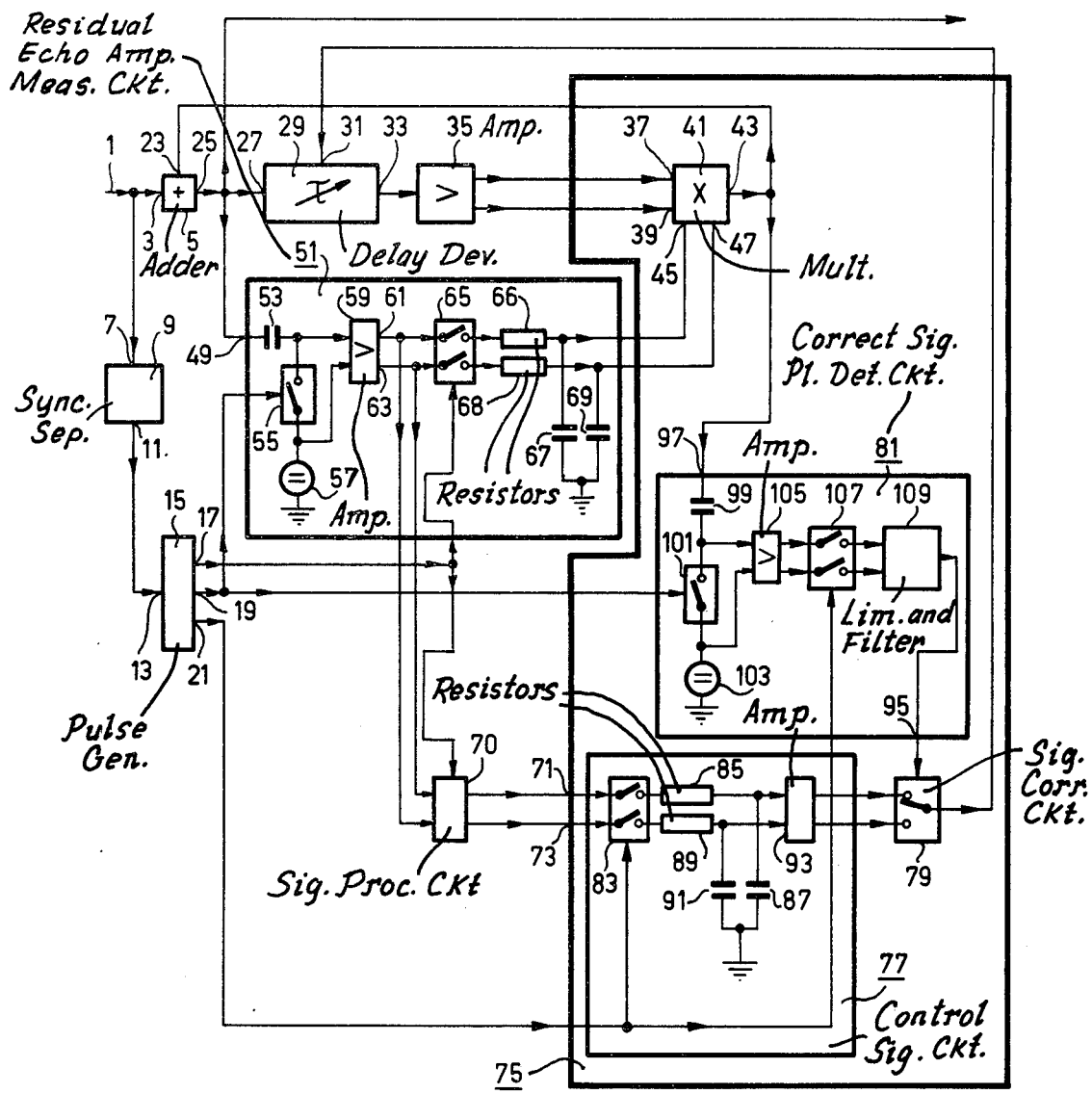

United States

Robers et al.

4,152,657

May 1, 1979

[54] ECHO SUPPRESSION CIRCUIT

[75] Inventors: Klaas H. J. Robers; Henri W. A. M. Hanneman; Bastiaan Visser, all of Eindhoven, Netherlands

[73] Assignee: U.S. Philips Corporation, New York, N.Y.

[21] Appl. No.: 807,007

[22] Filed: Jun. 16, 1977

[30] Foreign Application Priority Data

Jun. 25, 1976 [NL] Netherlands .......................... 7606934

[51] Int. Cl.² .......................... H03B 1/00; H04N 5/21; H04B 1/10
[52] U.S. Cl. .................................... 328/165; 358/167; 358/905; 325/473
[58] Field of Search .......................... 358/36, 167, 905; 325/42, 65, 473; 328/162, 165

[56] References Cited

U.S. PATENT DOCUMENTS

| | | | |
|---|---|---|---|
| 3,908,896 | 9/1975 | Monrolin | 328/165 X |
| 3,956,585 | 5/1976 | Butler et al. | 358/905 X |
| 3,968,448 | 7/1976 | Stenning | 328/165 X |
| 4,047,224 | 9/1977 | Yamaguti | 358/905 X |
| 4,053,932 | 10/1977 | Yamaguti et al. | 358/167 |

Primary Examiner—Robert L. Griffin
Assistant Examiner—Aristotelis M. Psitos
Attorney, Agent, or Firm—William J. Streeter; Thomas A. Briody; Simon L. Cohen

[57] ABSTRACT

A completely automatic suppression of an echo in a video signal is accomplished by using a multiplying circuit in the amplitude and polarity control of a correction signal which must compensate for the echo and an automatic control of the time delay of the correction signal by means of an echo polarity correction switch with which the polarity of the setting of the delay control characteristic is matched to the polarity of the echo to be suppressed.

3 Claims, 5 Drawing Figures

ECHO SUPPRESSION CIRCUIT

The invention relates to an echo suppression circuit wherein an output of a delay device having a delay time controllable by means of an echo-position independent control system is coupled to an input of an adder circuit for applying a correction signal thereto, this adder circuit having a further input for supplying a video signal in which the echo must be suppressed and an output which is coupled to an output of the echo suppressor circuit.

The German Offenlegungsschrift No. 23 13 252 discloses an echo suppression circuit of the above-mentioned type wherein the echo position-dependant control signal is derived from the input signal of the circuit. Between the echo position and the control signal there is then a relation which can be influenced by all sorts of magnitudes in the circuit so that consequently the instant at which the correction signal occurs may change and the echo suppression may become incomplete.

It is an object of the invention to so improve the control of the delay time that unwanted changes in the relation between the echo position and the control signal have substantially no influence any longer on the echo suppression.

An echo suppression circuit of the type mentioned in the preamble is therefore characterized in that coupled to the output of the adder circuit there is an echo polarity correction circuit from a control signal output of which the echo position-dependant control signal is obtained which output is coupled to a control signal input of the delay device for automatically adjusting the delay time thereof to the proper value.

By means of the measure according to the invention a fed back control system is obtained wherein the degree of echo suppression determines the delay time and, consequently, the influence of the relation between the echo position and the control signal is substantially removed.

The invention will now be further explained with reference to the accompanying drawing.

In this drawing

Figure 2:
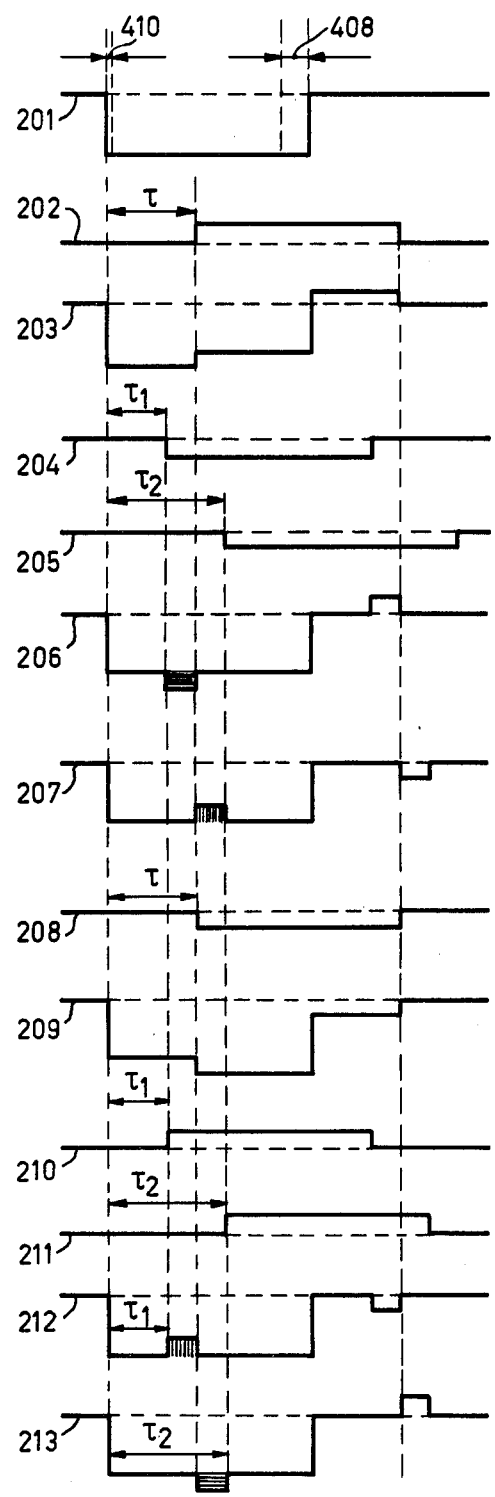
Figure 3:
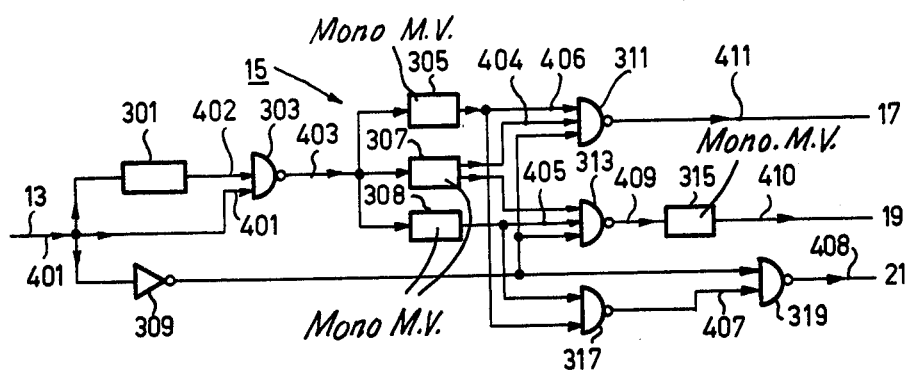
Figure 5:
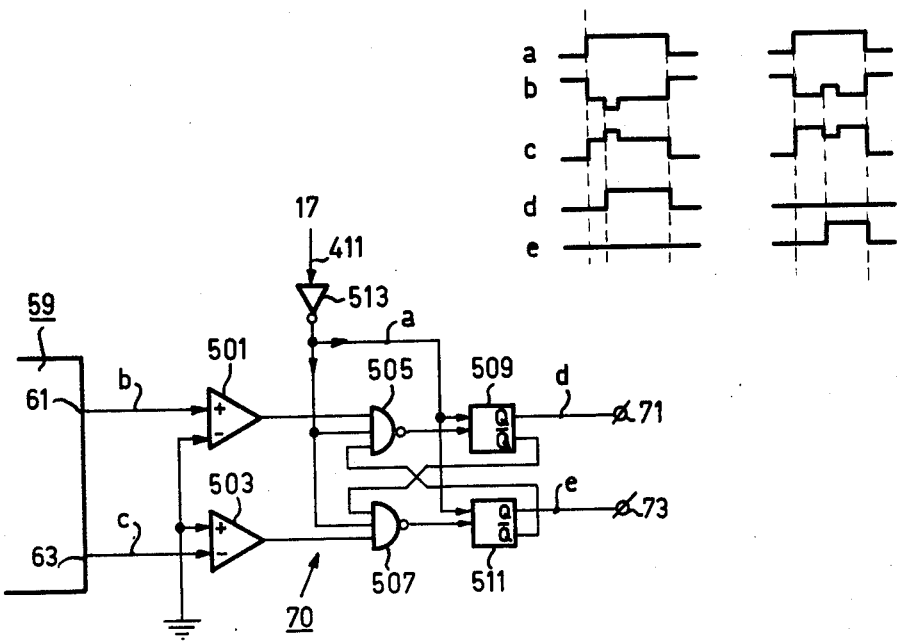
Figure 4:
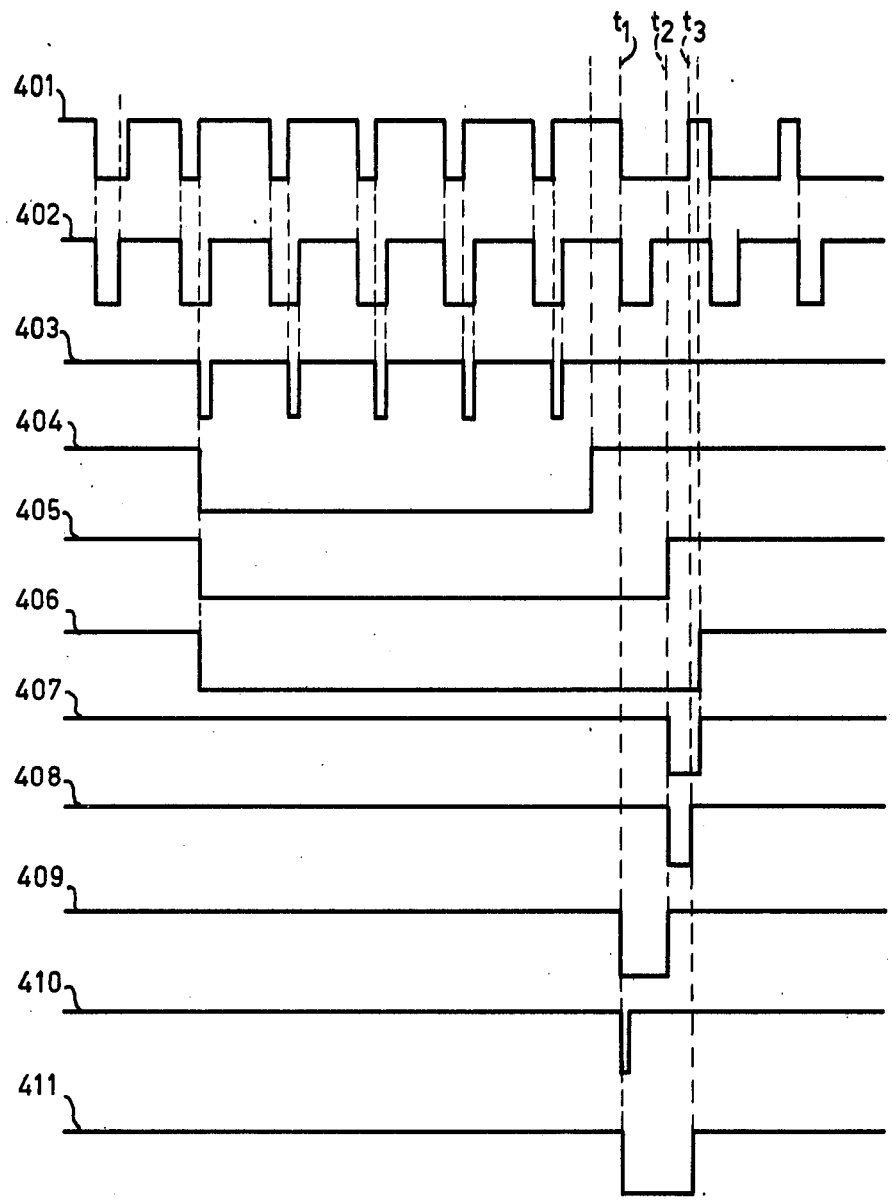

FIG. 1 shows a simplified block diagram of an echo suppression circuit according to the invention, FIG. 2 shows by means of a number of idealized waveforms the basic principle on which the invention is based, FIG. 3 shows a simplified block diagram of a pulse generator for an echo suppression circuit according to FIG. 1, FIG. 4 shows a number of waveforms as they occur in the circuit of FIG. 1 and FIG. 3 and FIG. 5 shows a signal processing circuit for an echo suppression circuit according to the invention.

In FIG. 1 a video signal containing an echo is supplied to an input 1. This video signal then appears at an input 3 of an adder circuit 5 and at an input 7 of a synchronization signal separation circuit 9. Then the synchronization separation circuit 9 supplies at an output 11 only the synchronization signal which is comprised in the video signal and which is shown in FIG. 4 by means of the waveform 401. This synchronization signal is supplied to an input 13 of a pulse generator 15 which supplies at an output 17 a signal as indicated in FIG. 4 by means of the waveform 408, at an output 19 the waveform 410, and at an output 21 the waveform 411.

A correction signal with which the echo and the video signal supplied to the input 3 must be suppressed is supplied to a further input 23 of adder circuit 5. At an output 25 of the adder circuit 5 to which also the output of the circuit is connected a corrected video signal is then produced which is furthermore supplied to an input 27 of a delay device 29. The delay time of this delay device 29 is adjustable by means an echo position-dependant control signal supplied to an input 31. At an output 33 of the delay device there then appears a corrected video signal, the correction being performed with a delay. This signal is amplified by an amplifier 35 and supplied balanced to an input 37, 39 of a multiplier circuit 41, an output 43 of which supplies the desired correction signal with the correct delay, amplitude and polarity. The multiplying circuit 41 may, for example, be of a type as described in International Solid State Circuits, Feb. 16, 1968, pages 114–115.

The correct amplitude and polarity of the correction signal at the output 43 is obtained by supplying a control signal, whose amplitude and polarity depends on the residual value of the echo in the corrected video signal at the output 25 of the adder circuit 5 to an additional, balanced input 45, 47 of the multiplying circuit 41. To this end the signal is supplied to an input 49 of a residual echo amplitude measuring circuit 51. The dc voltage value is removed from the signal by a capacitor 53 and thereafter the signal is clamped by means of a clamping switch 55 on a level determined by a voltage source 57 and thereafter supplied to a difference amplifier 59 to whose other end said level is supplied.

The clamping switch 55 is closed by a signal derived from the output 19 of the pulse generator 15 for approximately 50 n sec subsequent to the beginning of the vertical synchronization signal in the video signal. It may be assumed that this time the video signal does not contain echoes.

The amplifier 59 supplies at an output a balanced, amplified signal having as reference level the level at the beginning of the first pulse of the vertical synchronization signal. This balanced signal is sampled by a scanning switch 65 at the end of the first pulse of the vertical synchronization signal and through two resistors 66 and 68 respectively the signal values then occurring are supplied to and fixed in two capacitors 67 and 69 respectively which supply the desired signal at the input 45 and 47 respectively of the multiplying circuit 41. Should there be no echo at the end of the first pulse of the vertical synchronization signal the voltage across the capacitors 67 and 69 would be equal. If there is an echo then the amplitude and the polarity of the difference voltage across the capacitors 67, 69 will depend on the amplitude and the polarity of the echo. At its output 43 the multiplying circuit 41 then supplies a correction signal, the amplitude and polarity of which depend on the control voltage at the inputs 45, 47. Consequently, the amplitude of the residual value of the echo at the input 49 of the residual echo amplitude measuring circuit 51 is kept continuously at a minimum value independent of the polarity of the echo.

Preferably through a signal processing circuit 70 as shown in FIG. 5 the signal at the output 61, 63 of the difference amplifier 59 is supplied to an input 71, 73 of an echo polarity correction circuit 75 in which also the multiplying circuit 41 has a function and which, in addition, comprises a control signal generator 77, a sign correction circuit 79, and a correction signal polarity detection circuit 81.

The input 71, 73 of the echo polarity correction circuit 75 is at the same time the input of the control signal generator 77. The input 71, 73 is connected to an integrated circuit 85, 87, 89, 91 through a two-pole switch 83. The switch 83 is closed during the occurrence of the first pulse in the vertical synchronization signal. As a result the capacitors 87, 91 of the integrated circuit get a charge which depends on the time error which the correction signal at the input 23 has relative to the echo in the video signal at the input 3 of the adder circuit 5. The voltage across the capacitors 87, 91 which depend in the opposite direction on said time error are supplied through a difference amplifier 93 to the sign correction switch 79 which supplies the echo position-dependant control signal to the input 31 of the delay device 29.

The sign correction circuit is operated by a signal derived from an output 95 of the correction signal polarity detection circuit 81, to an input 97 of which the correction signal derived from the output 43 of the multiplying circuit 41 is supplied. Owing to the control loop which comprises the multiplying circuit this correction circuit is of such a polarity that it suppresses the echo to be corrected. The polarity of this correction signal is measured as follows by the correction signal polarity detection circuit 81. The dc voltage level is removed from the correction signal at the input 97 by a capacitor 99 whereafter the signal is brought by a clamping switch 101 at the beginning of the first pulse of the vertical synchronization signal to a reference level determined by a voltage source 103. The clamping switch 101 is operated by the signal at the output 19 of the pulse generator 15. The clamped signal and the reference level are supplied to a difference amplifier 105 and thereafter to a switch 107 which is closed each time during the period of time the first pulse in the vertical synchronisation signal occurs by the signal derived from the output 21 of the pulse generator 15. The output signal of the switch 107 is supplied to the output 95 through a limiter and filter circuit 109. The polarity of the signal at this output 95 depends on the polarity of the correction signal at the input 97 and, consequently, the position of the switch 79 is invariably kept such that the echo position-dependant control signal at the output of the switch is of the correct polarity to be able to correct the delay time of the delay device 29 in the proper manner. This will now be further explained with reference to FIG. 2.

FIG. 2 shows a number of idealized waveforms of which the waveform indicated by 201 represents the first pulse of the vertical synchronization signal. In this waveform 201 the periods of time of the pulses indicated in FIG. 4 by 410 and 408 at the outputs 19 and 17 respectively of the pulse generator 15 have been given the same reference numerals for the purpose of orientation.

The waveform 202 indicates an echo having a polarity which is opposite to that of the waveform 201 and which is delayed relative thereto over a time $\tau$ whilst a waveform 208 illustrates an echo having the same delay time but of a polarity equal to that of the waveform 201. A waveform 203 represents the video signal with the echo at the input 3 of the adder circuit 5 at the occurrence of an echo indicated by 202 and a waveform 209 represents the video signal at the occurrence of an echo indicated by 208.

If the video signal has the waveform 203 the multiplying circuit 41 can supply a correction signal having a waveform 204 or a waveform 205, the polarity of which is indeed correct owing to the control system but the delay being $\tau_1 < \tau$ or $\tau_2 > \tau$. At the output 25 of the adder circuit a signal is then produced which has the waveform 206 or 207 respectively in which from $\tau_1$ to $\tau$ or from $\tau$ to $\tau_2$ respectively the remnant of an echo occurs which is negative (hatched horizontally) for the waveform 206 and positive (hatched vertically) for the waveform 207. With an echo of a polarity opposite to that of the signal the echo residual value consequently changes from negative to positive if the delay time of the delay device 29 changes from lower to higher than the desired value.

If the correction signal has a waveform 210 or 211 for compensating an echo as indicated by the waveform 208 the echo residual value, however, changes, as appears from two waveforms 212 and 213 from positive to negative if the delay time of the delay device 29 increases from $\tau_1 < \tau$ to $\tau_2 > \tau$. So it is evident that the polarity of the control signal at the input 31 must be matched if the polarity of the correction signal changes and this is done with the sign correction switch 79 which is operated by the correction signal polarity detector circuit 81 as described above. The control signal generator 77 supplies two signals as a function of the echo residual value, the sense into which they change in dependancy of the echo residual value being opposite and of which the signal correction switch 79 passes the correct signal on to the input 31 of the delay device 29.

It will be clear that instead of the storage circuits 67, 69 and/or 87, 91 digital storage circuits may be used if so desired as, for example, described in FIG. 4 of the U.S. Pat. No. 3,987,482.

FIG. 3 shows a possible circuit for the pulse generator 15, the reference numerals at the inputs and outputs the same as those in FIG. 1 and wherein reference numerals at the signal leads indicate which waveforms of FIG. 4 are produced in those signal leads.

The synchronizing signal 401 at the input 13 is supplied to a monostable multivibrator 301 which supplies a signal 402 in which each negative-going edge of the synchronization signal 401 is followed by a pulse which is of a shorter duration than the horizontal synchronization pulses but of a longer duration than the equalization pulses in the synchronization signal 401. A NAND gate 303 to which the signals 401 and 402 are supplied then supply immediately prior to the vertical synchronization signal a plurality of pulses in accordance with a waveform 403, the negative-going edge of the first pulse starting three monostable multivibrators 305, 307, 309 which supply a waveform 406 and 404, 405 respectively, the waveforms 404 and 406 of which are supplied together with a waveform 401 which is inverted by means of an inverter 309 to a NAND gate 311, which NAND gate 311 supplies a waveform 411 which supplies a pulse during the time $t_1$ to $t_3$ in which the first pulse of the vertical synchronization signal occurs.

The waveform 405 is supplied to a NAND gate 313 to which also the inverse of the waveform 404 and the inverse of the waveform 401 is connected so that a signal having a waveform 409 is produced at the output of this gate. This is a pulse whose leading edge occurs at the instant $t_1$, so at the beginning of the first pulse of the vertical synchronization signal. The leading edge of this pulse starts a monostable multivibrator 315 which supplies a waveform 410 i.e. a 50 n sec pulse starting at the instant $t_1$.

In addition, the waveform 405 is supplied together with the waveform 406 to a NAND gate 317. The NAND gate 317 supplies the waveform 407 which is supplied to a NAND gate 319 together with the inverse of the waveform 401. The waveform 408 is then produced at the output 21 of this NAND gate 319.

In FIG. 5 the output 61 of the amplifier 59 is connected to a positive input of a difference amplifier 501 and the input 63 to the negative input of a difference amplifier 503. The negative input of the difference amplifier 501 and the positive input of the difference amplifier 503 are connected to a suitable dc voltage or to chassis. The output of the difference amplifier 501 is connected to an input of a NAND gate 505 and the output of the difference amplifier 503 to an input of a NAND gate 507. The output of the NAND gate 505 is connected to a set input of a monostable multivibrator 509 and the output of the NAND gate 507 to a set input of a monostable multivibrator 511. The instable period of these multivibrators exceeds the time of duration of the waveform 411 which is supplied through an amplifier and inverter 513 to an input of each of the NAND gates 505, 507 and to a reset input of the monostable multivibrators 509, 511. Consequently the Q outputs of the multivibrators 509, 511 are low outside the period of time that the waveform 411 is low. Within that period of time an increasing signal at the set input of one of the multivibrators 509, 511 may cause this multivibrator to change state so that through a connection from the $\overline{Q}$ output of the multivibrator 509 to the NAND gate 507 or from the $\overline{Q}$ output of the multivibrator 511 to the NAND gate 505 the other multivibrator is blocked and can no longer change state. As a consequence either the output 71 becomes high if an echo residual signal having a falling edge occurs at the input 61 or the output 73 if an echo residual signal having a falling edge occurs at the input 63, The amplitude of these output signals is large and independent of the amplitude of the echo residual signals so that at all times a signal having a large amplitude is supplied to the control signal generator connected to the terminals 71, 73.

It will be clear that a circuit according to the invention, can be arranged for suppressing greater numbers of echoes for example by using additional controllable delay devices.

In the above the leading edge of the vertical synchronization signal is used as reference signal for suppressing the echo. It is, for example, also possible to use another reference signal in the video signal which may even have been applied especially for that purpose and which may have a matched amplitude and rise time.

The echo suppression circuit discussed above was of a recursive type. If desired a circuit according to the invention may also be constructed in a non-recursive manner.

What is claimed is:

1. An echo suppression circuit comprising an adder having an input means for receiving a signal having an echo, a control signal input, and an output means for providing a signal with at least a reduced echo; a delay device having an input coupled to said adder output means, a control signal input means for controlling the time delay thereof, and an output; and an automatic echo polarity correction circuit having an input coupled to said delay device ouptut, a first output means coupled to said adder control signal input for supplying a correction signal thereto, and a second output means coupled to said delay device control signal input means for supplying an echo position dependent control signal thereto for automatically adjusting the delay time thereof to the proper value.

2. An echo suppression circuit as claimed in claim 1, wherein the echo polarity correction circuit comprises a multiplying circuit having a first input coupled to said output of the delay device and a second input; and further comprising an echo residual amplitude measuring circuit having an input coupled to the output of the adder circuit and an output coupled to said multiplier second input; said multiplier having an output from which the correction signal is obtained.

3. An echo suppression circuit as claimed in claim 2, wherein said echo polarity correction circuit further comprises a correction signal polarity detector having an input coupled to said multiplier output and an output, a sign correction switch having a control signal input coupled to said correction signal polarity detector output and a signal input; and a control signal generator coupled to said switch signal input.

* * * * *